United States Patent
Binetruy et al.

(10) Patent No.: US 6,881,024 B2
(45) Date of Patent: Apr. 19, 2005

(54) SYSTEM FOR DECOUPLING A FAN FROM A TURBOJET BY MEANS OF AN EXPLOSIVE CHARGE

(75) Inventors: Gabriel Binetruy, Nanteau sur Lunain (FR); Jean-Marie Desindes, Mennecy (FR); Robert Kervistin, Le Mee sur Seine (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/674,348

(22) Filed: Oct. 1, 2003

(65) Prior Publication Data

US 2004/0161331 A1 Aug. 19, 2004

(30) Foreign Application Priority Data

Oct. 23, 2002 (FR) .............................................. 02 13203

(51) Int. Cl.[7] .............................................. F01D 21/00
(52) U.S. Cl. ........................ 415/9; 415/170 R; 384/542
(58) Field of Search ........................ 415/2, 9, 170 R, 415/174, 204 A; 384/542

(56) References Cited

U.S. PATENT DOCUMENTS 2,467,140 A * 4/1949 Livermon ............... 244/103 S
5,104,063 A * 4/1992 Hartley ................... 244/103 S
5,417,501 A * 5/1995 Hyde et al. ................. 384/542

FOREIGN PATENT DOCUMENTS

| FR | 2 373 698 | 7/1978 |
|---|---|---|
| FR | 2 463 853 | 2/1981 |
| FR | 2 709 157 | 2/1995 |
| FR | 2 752 024 | 2/1998 |

* cited by examiner

Primary Examiner—F. Daniel Lopez
Assistant Examiner—James M. McAleenan
(74) Attorney, Agent, or Firm—Oblon, Spivak, McClelland, Maier & Neustadt, P.C.

(57) ABSTRACT

A system for decoupling a fan of a turbojet, the turbojet including a moving fan shaft mounted on bearings each connected to a stationary structure of the turbojet by bearing supports, the bearing supports being fixed to the stationary structure of the turbojet via mechanical links serving, during normal operation of the turbojet, to transmit the forces generated by rotation of the fan, the mechanical links include explosive charges enabling the links to be broken, the explosive charges being controlled by a full authority digital engine control computer on the basis of means for measuring the mechanical stresses in the turbojet and of a computer model simulating the static, dynamic, and thermodynamic behavior of the turbojet.

8 Claims, 2 Drawing Sheets

SYSTEM FOR DECOUPLING A FAN FROM A TURBOJET BY MEANS OF AN EXPLOSIVE CHARGE

BACKGROUND OF THE INVENTION

The present invention relates to the general field of systems for fixing a fan to a turbojet. It relates more particularly to a system for decoupling a fan from a turbojet in the event of large forces on the fan support.

In flight, a turbojet receives air through a fan. The fan serves to compress a quantity of this air which contributes to the thrust from the turbojet. It comprises a plurality of blades which perform said compression and it is set into rotation by a turbine via a drive shaft. The drive shaft is mounted on bearings which are connected to stationary portions of the turbojet.

Under extreme circumstances, such as losing a blade, a high level of unbalance is generated. Such unbalance gives rise to cyclical loading and vibration, which the bearings supporting the fan drive shaft communicate to the stationary portions of the turbojet, with significant risk of damage.

In order to provide some protection against such danger, it is generally possible to use a decoupling system which allows the fan to be decoupled from the stationary portions of the turbojet in the event of high levels of force. That solution consists in supporting the drive shaft of the fan by a series of links that are suitably placed and calibrated so as to break under a determined load, the fan and its drive shaft then becoming decoupled from the stationary portions of the turbojet. The links are implemented in the form of screws and nuts which are dimensioned so as to break in shear or in bending.

Such a decoupling system nevertheless presents numerous drawbacks. In particular, it implies that the links are broken by direct transmission of the radial force coming from the unbalance of the fan drive shaft, which means there is a high degree of uncertainty as to the exact moment at which the links will break. In order to calculate the decoupling load it is necessary to take account of numerous parameters (in particular the static and dynamic forces applied to the turbojet), and these parameters vary, both during operation and over the lifetime of the turbojet. These varying parameters are not taken into consideration by conventional decoupling systems when calibrating the decoupling load. In addition, in certain situations in flight, it is sometimes preferable not to decouple the fan, but instead to reduce the thrust from the turbojet in order to remain below the decoupling load.

OBJECT AND SUMMARY OF THE INVENTION

The present invention thus seeks to mitigate those drawbacks by proposing a reliable system for decoupling the fan of a turbojet, which makes it possible to eliminate all uncertainty as to the moment at which links are broken. The invention also seeks to provide a decoupling system that takes account of the static and dynamic stresses applied to the turbojet in order to anticipate, and indeed avoid, critical operation of the turbojet.

To this end, the invention provides a system for decoupling a fan of a turbojet, the turbojet including a moving fan shaft mounted on bearings each connected to a stationary structure of the turbojet by bearing supports, the bearing supports being fixed to the stationary structure of the turbojet via mechanical links serving, during normal operation of the turbojet, to transmit the forces generated by rotation of the fan, wherein the mechanical links include explosive charges enabling the links to be broken, the explosive charges being controlled by a full authority digital engine control (FADEC) computer on the basis of means for measuring the mechanical stresses in the turbojet and of a computer model simulating the static, dynamic, and thermodynamic behavior of the turbojet.

Advantageously, the decoupling system further comprises a computer connected to the measurement means to obtain a representation of the static, dynamic, and thermodynamic behavior of the turbojet as a function of a model of the behavior and as a function of the measurements of mechanical stresses of the turbojet, the computer being connected to the FADEC computer to cause the links to break as a function of the static, dynamic, and thermodynamic behavior of the turbojet. This computer thus makes it possible, in real time, to determine the stress levels applied to the sensitive parts of the turbojet during the various stages of its operation and to forward this data to the FADEC computer.

As a result, the turbojet fan is not decoupled under a pre-calibrated load, but by exploding a charge triggered by the FADEC computer of the airplane on the basis of information from suitable measurements, and of data that is characteristic of the operation of the turbojet. All uncertainty is thus eliminated about the moment at which the charge for breaking the links will be triggered.

Each explosive charge has an electrically or optically controlled detonator which may be integrated in the mechanical link. The explosive charges may be based on explosive powder or on capsules of gas under pressure.

The means for measuring the mechanical stresses on the engine comprise one or more of the following sensors: pressure sensors, temperature sensors, displacement sensors, and vibration sensors.

BRIEF DESCRIPTION OF THE DRAWINGS

Other characteristics and advantages of the invention appear from the following description given with reference to the accompanying drawings which show an embodiment of the invention that has no limiting character. In the figures.

DETAILED DESCRIPTION OF AN EMBODIMENT

Figure 1:
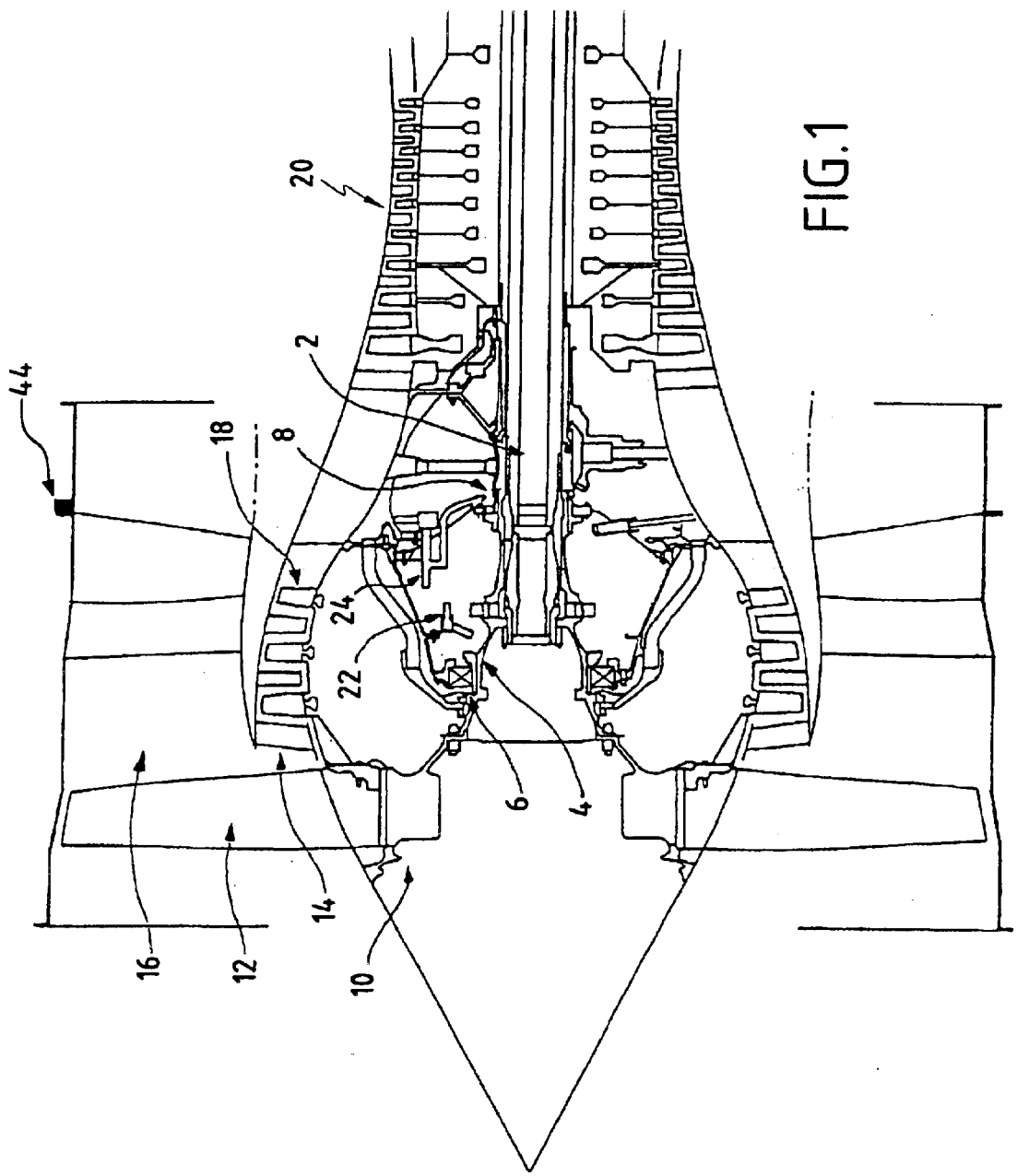
FIG. 1 is a fragmentary view of a turbojet in longitudinal section.

Reference is made initially to FIG. 1 which shows part of a turbojet in longitudinal section.

The turbojet is constituted in particular by a low pressure shaft 2, and more precisely a fan drive shaft 4 mounted on a front bearing 6 and a rear bearing 8. At its front end, the shaft 4 carries a fan 10 fitted with a plurality of blades 12 extending radially in front of the inlet to an inner gas stream 14 and the inlet to an outer stream 16 surrounding the inner stream. In the inner stream 14, the turbojet further comprise a low-pressure compressor 18 followed by a high-pressure compressor 20 situated downstream therefrom. Lubrication ducts 22 and 24 connected to pumps (not shown) serve to inject oil into the bearings 6 and 8.

Figure 2:
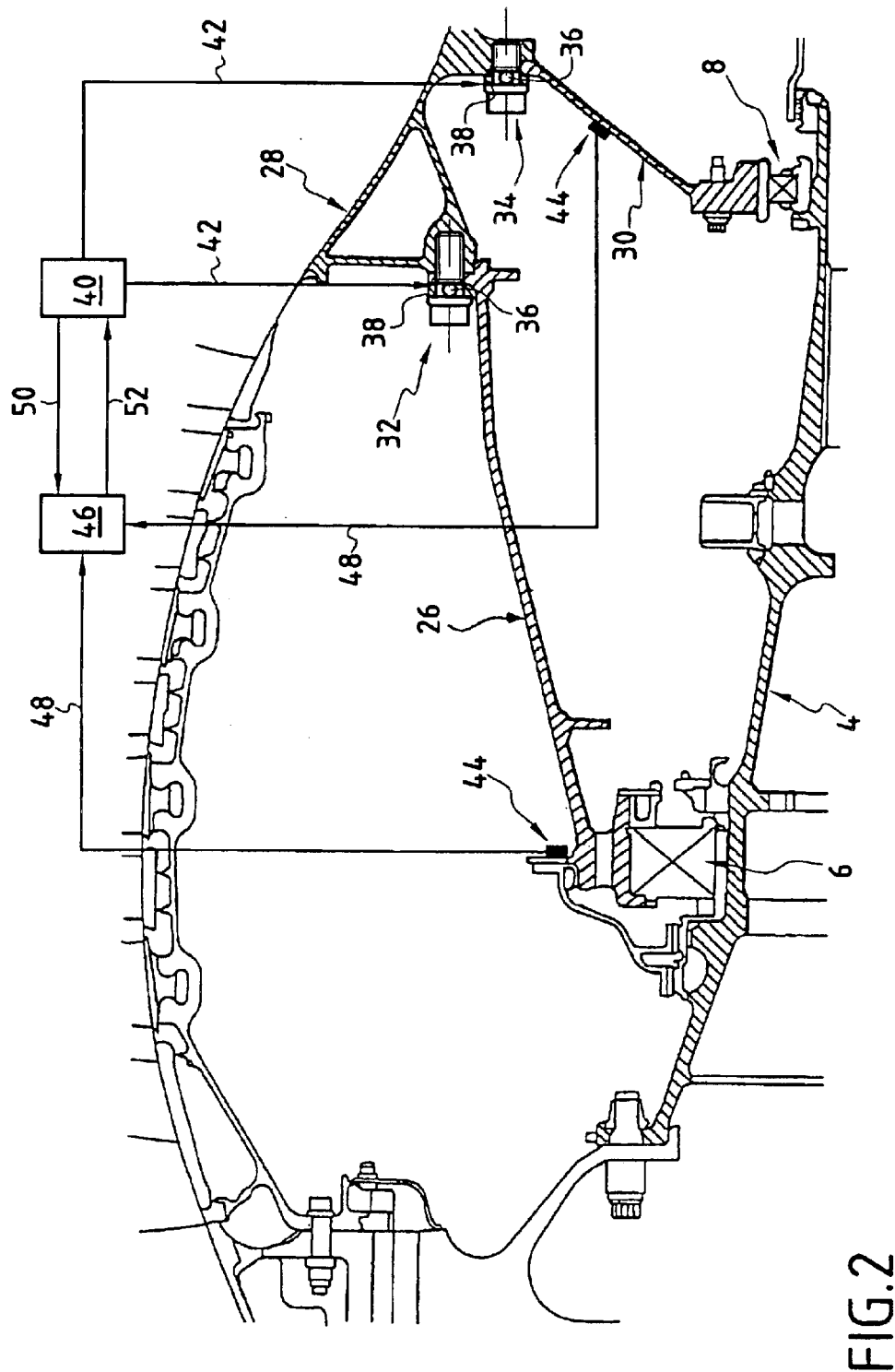
FIG. 2 is a diagrammatic view of the decoupling system of the invention.

In FIG. 2, it can be seen that the front bearing 6 is supported by a front bearing support 26 which is connected to part of the stationary structure 28 of the turbojet. Similarly, the rear bearing 8 is supported by a rear bearing support 30 which is likewise connected to the stationary structure 28. The front and rear bearing supports are connected to the stationary structure 28 of the turbojet via mechanical links involving respective screws 32 and 34. During normal operation of the turbojet, these mechanical links serve to transmit the forces generated by rotation of the fan.

In the invention, the mechanical links 32 and 34 between the stationary structure 28 and the front and rear bearing supports 26 and 30 include respective decoupling systems. Each decoupling system comprises in particular a cavity 36 formed in the corresponding screw 32 or 34. The cavity is filled with a pyrotechnic charge. The pyrotechnic charge is a chemical composition of known type which, for example, is in the form of an explosive powder or an explosive gas. The pyrotechnic charge may also be a capsule of gas under pressure that can be made to explode by means of a detonator. The explosive charge is present in a quantity that is sufficient to ensure that the corresponding screw 32, 34 will break. A detonator 38 (or ignitor) under electrical or optical control and of conventional type is also provided in order to cause the pyrotechnic charge to explode. The detonator may be integrated directly in the corresponding screw 32, 34, as shown in FIG. 2.

The detonator 38 of the explosive charge is controlled directly by the full authority digital engine control (FADEC) computer 40 via an electrical or optical connection 42. The computer 40 is an electronic unit of conventional type which serves to manage the turbojet and thus ensure airplane safety by preventing serious damage to the turbojet. In the invention, the FADEC computer also serves to trigger the detonators 38 of the explosive charges fitted to the mechanical links 32, 34 between the stationary structure 28 of the turbojet and the front and rear bearing supports 26 and 30. These explosive charges are triggered on the basis of measuring (static and dynamic) mechanical stresses on the turbojet and on the basis of a model of the static, dynamic, and thermodynamic behavior of the turbojet.

Static and dynamic stresses are measured by measuring devices 44 on those parts of the turbojet which are most sensitive to the various applied stresses. For example, the parts that are most sensitive to such stresses are the bearing supports 26 and 30. The measuring devices are sensors of known type serving to measure various parameters of the turbojet operation on said parts, and in particular to measure: the speed of rotation of the fan 10; the pressures and temperatures inside the turbojet; the relative displacements of the fan relative to the stationary portions of the engine; and the vibrations of the engine structure. Accelerometer type sensors 44 are shown by way of example in FIGS. 1 and 2. In FIG. 1, the sensor 44 is positioned on the exhaust case of the engine, and in FIG. 2, the sensors 44 are disposed on the bearing supports 26 and 30. The sensors are of conventional technology or of microtechnology, where microtechnology presents the advantage of enabling a larger amount of information to be obtained per unit area.

The measuring devices 44 transmit the measurements they make of stresses to an on-board computer 46. The connections 48 are by wire or by wireless when the sensors are microtechnology sensors. The purpose of the computer 46 is to represent the behavior of the turbojet both mechanically in terms of static and dynamic forces, and thermodynamically as a function of the stress measurements performed by the measuring devices 44 and as a function of a model of the behavior of the turbojet. The model operates on measured stresses and thermodynamic data transmitted by the FADEC computer 40 to the computer 46 (connection 50). It serves to simulate the behavior of the turbojet both mechanically (static and dynamic forces) and thermodynamically. It may be of the analytical type or of the finite element type. Analytical modeling corresponds to modeling based on experimental data or derived from calculations performed concerning the behavior of the turbojet, with the results of said calculations being put into analytical form in order to be used. Finite element modeling can be implemented in two or three dimensions. Each element of the turbojet is associated with a deformation load. Thus, on the basis of data concerning how the turbojet is operating (speed of rotation, thrust, temperatures, pressures, . . . ), the model serves in particular to calculate the static and dynamic forces on each sensitive element of the turbojet, and in particular on the fan support, under all operating conditions of the turbojet.

The computer 46 is connected to the FADEC computer 40 so as to transmit thereto over a connection 52 a representation of the static, dynamic, and thermodynamic behavior of the turbojet. Thus, on the basis of the measurements performed by the devices 46, the computer 46 serves to detect any possible unbalance, to analyze the cause of such unbalance on the basis of rules that were pre-established during design of the engine (for example as a function of a percentage of material lost from a blade of the fan), to predict a new distribution of loads in the turbojet, and to inform the FADEC computer 40 when a critical value is reached and of the means available for reducing it. For this purpose, the FADEC computer can either inform the airplane pilot to act directly on parameters of the turbojet (e.g. its thrust) if a functional situation thereof is acceptable given the instantaneous and foreseeable needs of the airplane, or else to authorize the limiting load to be exceeded during a limited length of time without triggering decoupling, or else to initiate the explosive charges of the links 32 and 34 directly if no acceptable functional situation for the turbojet can be envisaged.

Allowing the FADEC computer to initiate directly the breaking of the links as a function of measured static and dynamic stresses and as a function of modeling the static, dynamic, and thermodynamic behavior of the turbojet presents numerous advantages. It makes it possible to anticipate, and indeed to avoid, having the turbojet operate in critical manner under the following difficult situations:

during takeoff, in the event of a part of a fan blade being lost (e.g. after ingesting a bird), it is generally preferable for safety reasons to avoid decoupling the fan. In this situation, the decoupling system of the invention serves to inform the pilot of the need to reduce the thrust from the turbojet somewhat in order to keep it below critical loading, whereas a conventional decoupling system would already have decoupled the fan;

under all flight conditions, the decoupling system of the invention makes it possible by virtue of its ability to adapt (in terms of decoupling level and in terms of turbojet control actions), to optimize thrust from the turbojet as a function of events. It is thus possible to avoid putting the airplane in a difficult situation:

either by not decoupling the fan while limiting the speed of the turbojet to below a limit value corresponding to the decoupling load if the airplane's need for thrust makes this possible;

or, as a function of the airplane's need for thrust, to maintain the turbojet at high speed and loading, possibly above the limit value at which decoupling would normally occur, so as to allow the pilot to perform some important maneuver of the airplane, with a malfunction indicator informing the pilot that a maintenance operation will subsequently be necessary;

in the event of both turbojets of a two-engine airplane losing a blade (e.g. by both jets ingesting birds), which might lead to both turbojets being decoupled if a conventional decoupling system were in use, the system of the invention makes it possible to put off decoupling of the fan of the second turbojet so as to optimize residual thrust during a difficult period of flight.

What is claimed is:

1. A system for decoupling a fan of a turbojet, the turbojet including a moving fan shaft mounted on bearings each connected to a stationary structure of the turbojet by bearing supports, said bearing supports being fixed to said stationary structure of the turbojet via mechanical links serving, during normal operation of the turbojet, to transmit the forces generated by rotation of the fan, wherein said mechanical links include explosive charges enabling said links to be broken, said explosive charges being controlled by a full authority digital engine control computer on the basis of means for measuring the mechanical stresses in the turbojet and of a computer model simulating the static, dynamic, and thermodynamic behavior of the turbojet.

2. A decoupling system according to claim 1, including a computer connected to the measurement means to obtain a representation of the static, dynamic, and thermodynamic behavior of the turbojet as a function of a model of said behavior and as a function of said measurements of mechanical stresses of the turbojet, said computer being connected to said FADEC computer to cause said links to break as a function of said static, dynamic, and thermodynamic behavior of the turbojet.

3. A decoupling system according to claim 1, wherein each of said explosive charges includes a detonator integrated in said mechanical link.

4. A decoupling system according to claim 3, wherein said detonators are electrically controlled.

5. A decoupling system according to claim 3, wherein said detonators are optically controlled.

6. A decoupling system according to claim 1, wherein said explosive charges are explosive powders.

7. A decoupling system according to claim 1, wherein said explosive charges are capsules of gas under pressure.

8. A decoupling system according to claim 1, wherein said means for measuring mechanical stresses of the engine comprise one or more of the following sensors: pressure sensors; temperature sensors; displacement sensors; and vibration sensors.

* * * * *